United States Patent [19]

Carrel et al.

[11] Patent Number: 5,778,167
[45] Date of Patent: Jul. 7, 1998

[54] SYSTEM AND METHOD FOR REASSIGNING A STORAGE LOCATION FOR RECONSTRUCTED DATA ON A PERSISTENT MEDIUM STORAGE SYSTEM

[75] Inventors: John Carrel, West Roxbury; Brian Mullahy, Leominster, both of Mass.

[73] Assignee: EMC Corporation, Hopkinton, Mass.

[21] Appl. No.: 873,635

[22] Filed: Jun. 12, 1997

Related U.S. Application Data

[63] Continuation of Ser. No. 259,498, Jun. 14, 1994, abandoned.
[51] Int. Cl.⁶ .................................................. G06F 11/00
[52] U.S. Cl. .......................... 395/182.06; 395/185.07; 711/165
[58] Field of Search .................. 371/10.2, 10.3; 395/180, 181, 182.01, 182.03, 182.04, 182.05, 182.06, 185.01, 185.06, 185.07; 711/100, 111, 155, 156, 165

[56] References Cited

U.S. PATENT DOCUMENTS

| | | | |
|---|---|---|---|
| 4,611,314 | 9/1986 | Ogata et al. | 369/32 |
| 4,682,328 | 7/1987 | Ramsay et al. | 371/13 |
| 4,697,266 | 9/1987 | Finley | 371/12 |
| 4,775,978 | 10/1988 | Hartness | 371/38 |
| 4,791,622 | 12/1988 | Clay et al. | |
| 4,817,004 | 3/1989 | Kroll et al. | 364/900 |
| 4,845,632 | 7/1989 | Kroll et al. | 364/200 |
| 4,942,579 | 7/1990 | Goodlander et al. | 371/51 |
| 4,949,326 | 8/1990 | Takagi et al. | 369/54 |
| 4,989,206 | 1/1991 | Dunphy, Jr. et al. | 371/10.1 |
| 5,072,378 | 12/1991 | Manka | 395/575 |
| 5,077,736 | 12/1991 | Dunphy, Jr. et al. | 371/10.1 |
| 5,101,492 | 3/1992 | Schultz et al. | 395/575 |
| 5,109,505 | 4/1992 | Kihara | 395/575 |
| 5,138,710 | 8/1992 | Kruesi et al. | 395/575 |
| 5,148,432 | 9/1992 | Gordon et al. | 371/10.1 |
| 5,166,936 | 11/1992 | Ewert et al. | 371/21.6 |
| 5,195,100 | 3/1993 | Katz et al. | 371/66 |
| 5,201,044 | 4/1993 | Frey, Jr. et al. | 395/575 |
| 5,208,813 | 5/1993 | Stallmo | 371/10.1 |
| 5,255,270 | 10/1993 | Yanai et al. | 371/18.2 |
| 5,313,585 | 5/1994 | Jeffries et al. | 395/425 |
| 5,313,626 | 5/1994 | Jones et al. | 364/200 |
| 5,335,235 | 8/1994 | Arnott | 371/49.2 |
| 5,341,493 | 8/1994 | Yanai et al. | 395/750 |
| 5,379,411 | 1/1995 | Morgan et al. | 395/185.01 |
| 5,438,575 | 8/1995 | Bertrand | 371/48 |

FOREIGN PATENT DOCUMENTS 280357  11/1988  Japan ...................... G06F 12/16

*Primary Examiner*—Albert Decady
*Attorney, Agent, or Firm*—Weingarten, Schurgin, Gagnebin & Hayes LLP

[57] ABSTRACT

A system and method for reassigning a data storage location containing corrupted data to a new data storage location containing the reconstructed previously corrupted data. The system includes a persistent medium storage device such as a disk in electrical communication with a persistent medium storage device controller having a nonvolatile memory. Corrupted data, detected during a read operation, is reconstructed by the system and the reconstructed data is written to nonvolatile memory. An indicator is set in a location in nonvolatile memory indicating that the reconstructed data is being written to a reassigned location on the persistent medium storage device. The persistent medium storage device then reassigns the storage location for the reconstructed data and the reconstructed data in nonvolatile memory is written to the reassigned location. Once the reconstructed data is written to the reassigned location, the indicator in nonvolatile memory is reset.

21 Claims, 3 Drawing Sheets

SYSTEM AND METHOD FOR REASSIGNING A STORAGE LOCATION FOR RECONSTRUCTED DATA ON A PERSISTENT MEDIUM STORAGE SYSTEM

This application is a continuation of application Ser. No. 08/259,498, filed Jun. 14, 1994 now abandoned.

FIELD OF THE INVENTION

The invention relates generally to storage devices and more specifically to the reassignment of a data storage location for reconstructed data.

BACKGROUND OF THE INVENTION

Referring to FIG. 1, a persistent medium storage device 10, such as a magnetic disk or magneto-optical disk, is typically configured to store data on a series of concentric tracks 12 each of which contains a number of storage locations termed blocks 14. Each block 14 holds a predefined number of data words 16. The persistent medium storage device 10 maintains a correspondence between the actual physical location of the data being stored and the address or location designation of the block 14 holding the data words 16.

Persistent medium storage devices typically also include a number of unassigned blocks 18 which are not generally used to store data. Typically, these unassigned blocks 18 are only used as replacement storage locations for the data in blocks 14 which are unreadable. When an unassigned block 18 is used to store data, it is reassigned the block address of the damaged block 14 it has replaced. In this manner, when a request is made to read a damaged block 14, the persistent medium storage device 10 instead reads the data in the reassigned block 18 as if it were the data in the damaged block 14.

A block 14 may become unreadable for a number of reasons. For example, contamination may obscure the data written at that location or a read-write head touchdown, caused by the read-write head of the persistent medium storage device 10 temporarily striking the surface of the persistent medium storage device 10, may damage the recording medium at the location of touchdown. The fact that a block 14 is unreadable is typically first detected when a request is made by the disk controller to read the block 14. If the block of data is damaged such that the data may be recovered by using the error correcting codes on the persistent medium storage device 10, the persistent medium storage device drive itself typically will recover the data without the intervention of the persistent medium storage device controller and report to the persistent medium storage device controller that an error has been corrected. However, if the damage to the data is so extensive that the error correcting codes on the persistent medium storage device cannot recover the data, the persistent medium storage device 10 will then report to the disk controller that the data in the requested block is unreadable.

When a block becomes unreadable such that the persistent medium storage device drive cannot recover the data in the block, the data that was in the unreadable block possibly may still be reconstructed by the persistent medium storage device controller. First, in the case of a mirrored system or RAID 5 implementation, a copy of the unreadable data may be obtained from the other persistent medium storage device in the mirrored pair. Similarly, in other RAID (Redundant Array of Independent Disks) level systems the data in the unreadable block may be reconstructed from blocks of data and error correcting codes distributed among the other disks in the RAID system.

Once the data from the unreadable block has been reconstructed, the reconstructed data is handled typically in one of two ways. In one method of handling the reconstructed data, the reconstructed data is provided to the read request which caused the data to be read, and the error condition subsequently to be detected. Subsequent read requests for the data in the damaged location will therefore require subsequent reconstruction.

Alternatively, the reconstructed data is stored in a reassigned block, which then takes the place of the damaged block, as far as the persistent medium storage device is concerned. Thus, when a read request is subsequently issued which would require the reading of the unreadable block, the persistent medium storage device instead reads the data located in the reassigned block.

A problem associated with reconstructing the same data for each read request is that the time needed to complete the read request is considerably lengthened. Thus if the data in the unreadable block is frequently accessed, a significant degradation may occur in disk efficiency.

The problem that occurs in the reassigning of the damaged block to an undamaged block and the writing of the reconstructed data to the undamaged block is more subtle. If the damaged data is reconstructed and a block reassignment is requested, the system can undergo a power failure or a system reset after the block has been reassigned but before the reconstructed data can be written to the reassigned block. Since the system is unaware that the reconstructed data was not yet written at the time of power failure or system reset, subsequent read requests to the unreadable block will result in invalid data being read from the reassigned block. The data read is invalid because the system reads the data that was in the reassigned block prior to the command to write the reconstructed data to the reassigned block. Further, other read failures which might rely on this reconstructed data to reconstruct still other unreadable data will also generate improperly reconstructed data thus further compromising the integrity of the system.

SUMMARY OF THE INVENTION

The invention relates to a system for reassigning a data storage location containing corrupted data to a new data storage location containing the reconstructed previously corrupted data. In one embodiment, the system includes a persistent medium storage device, such as a disk, in electrical communication with a persistent medium storage device controller having a nonvolatile memory. Corrupted data, detected during a read operation, is reconstructed by the system and the reconstructed data is written to nonvolatile memory. An indicator is set in a location in nonvolatile memory indicating that the reconstructed data is being written to a reassigned location on the persistent medium storage device. In one embodiment, the system also calculates and stores cyclic redundancy check (CRC) data along with the reconstructed data stored in nonvolatile memory. The persistent medium storage device then reassigns the storage location for the reconstructed data and the reconstructed data is written to that location. Once the reconstructed data is written to the reassigned location, the indicator in nonvolatile memory is reset.

The invention also relates to a method, in a system including a persistent medium storage device such as a disk in electrical communication with a persistent medium storage device controller having a nonvolatile memory, for reassigning a data storage location containing corrupted data to a new data storage location containing the reconstructed previously corrupted data. The method includes the steps of detecting corrupted data on the persistent medium storage device, reconstructing the previously corrupted data, writing the reconstructed data to nonvolatile memory, and setting an indicator in a location in nonvolatile memory indicating that the reconstructed data is being written to a reassigned location on the persistent medium storage device. The method further includes reassigning of the storage location for the reconstructed data, writing the reconstructed data to the reassigned storage location, and resetting the indicator in nonvolatile memory once the reconstructed data has been written to the reassigned location.

DESCRIPTION OF THE DRAWINGS

This invention is pointed out with particularity in the appended claims. The above and further advantages of this invention may be better understood by referring to the following description taken in conjunction with the accompanying drawing, in which:

DETAILED DESCRIPTION OF THE INVENTION

Figure 1:
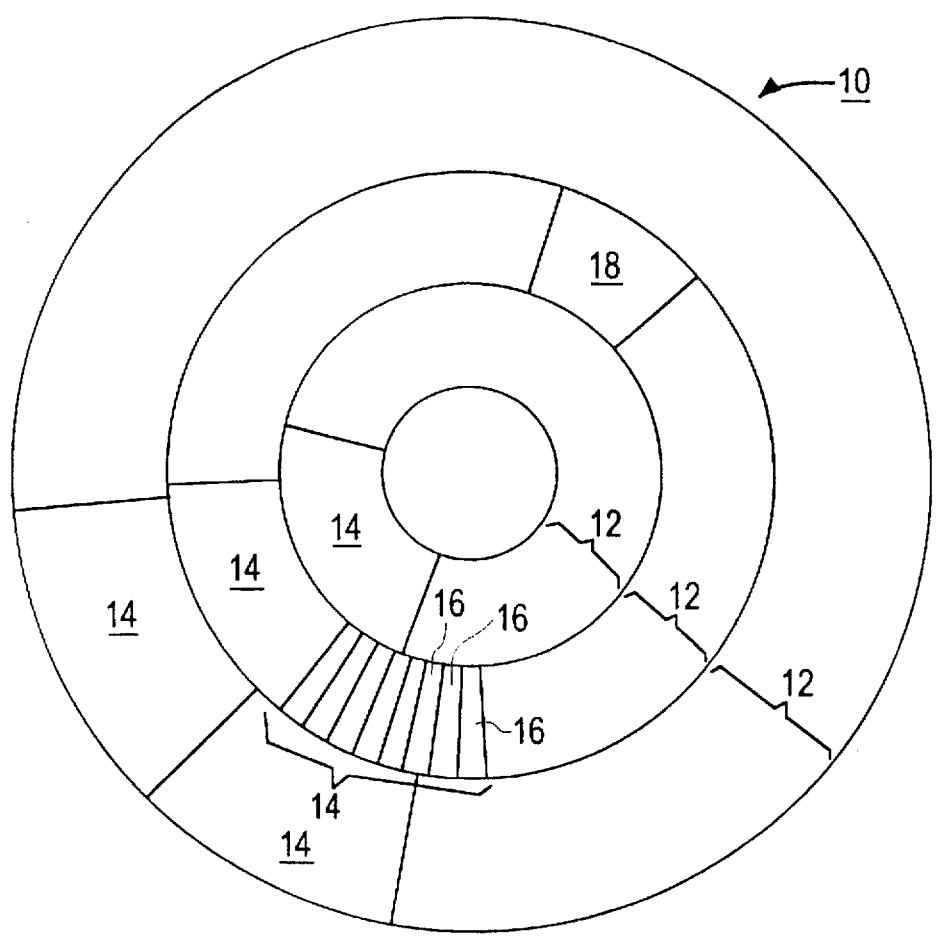
FIG. 1 depicts a diagram of the format of the medium in a prior art persistent medium storage device.
Figure 2:
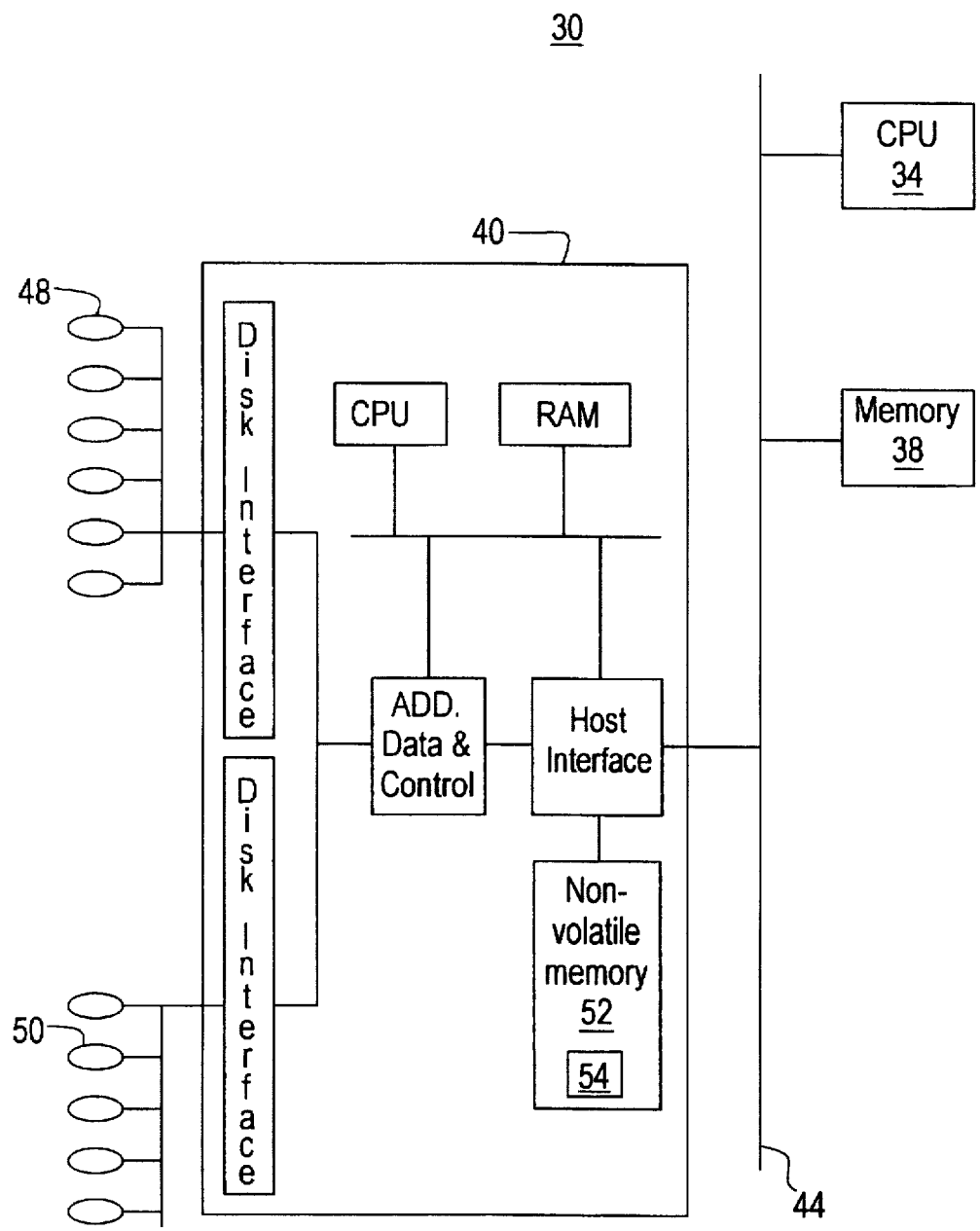
FIG. 2 depicts a block diagram of an embodiment of the presently disclosed apparatus for reassigning data storage locations.

In brief overview and referring to FIG. 2, an embodiment of a computer system 30 in which the system and method of the invention is capable of being practiced includes a central processing unit or CPU 34, a memory 38 and a persistent medium storage device controller 40, all of which are interconnected by a bus 44. In addition to being in electrical communication with the CPU 34 and memory 38, the persistent medium storage device controller 40 is in electrical communication with one or more persistent medium storage devices 48, 50, which will be referred to hereafter as disks. A plurality of disks 48 and 50 are employed in some RAID configurations, such as in systems employing mirroring or in systems where the data and error correction codes are spread across multiple disks. Additional disks, not numbered, may also be connected to the persistent medium storage medium controller 40.

When a read request is issued by the CPU 34 to the persistent medium storage device controller 40, which will hereinafter be referred to as a disk controller 40 without any loss of generality, the disk controller 40 determines where the data is located on a disk, for example disk 48, and requests that the data be read. If the data is unable to be read from the disk 48 but the disk 48 is able to reconstruct the data from the error correcting codes on the disk 48, the disk 48 reconstructs the data, and returns, to the disk controller 40, the reconstructed data and an error message, indicating that an error has been corrected. If the respective data is unable to be read from the disk drive 48, and the disk drive 48 cannot reconstruct the data, the disk drive 48 reports the error to the disk controller 40, and the disk controller 40 begins the process of reconstructing the data and reassigning the damaged block. Additionally, if the disk drive 48, is frequently required to reconstruct the data in a given block using the error correcting codes located on the disk, the disk controller 40 will reassign the corrupted block even though the disk drive 48 is still able to reconstruct the data.

Figure 3:
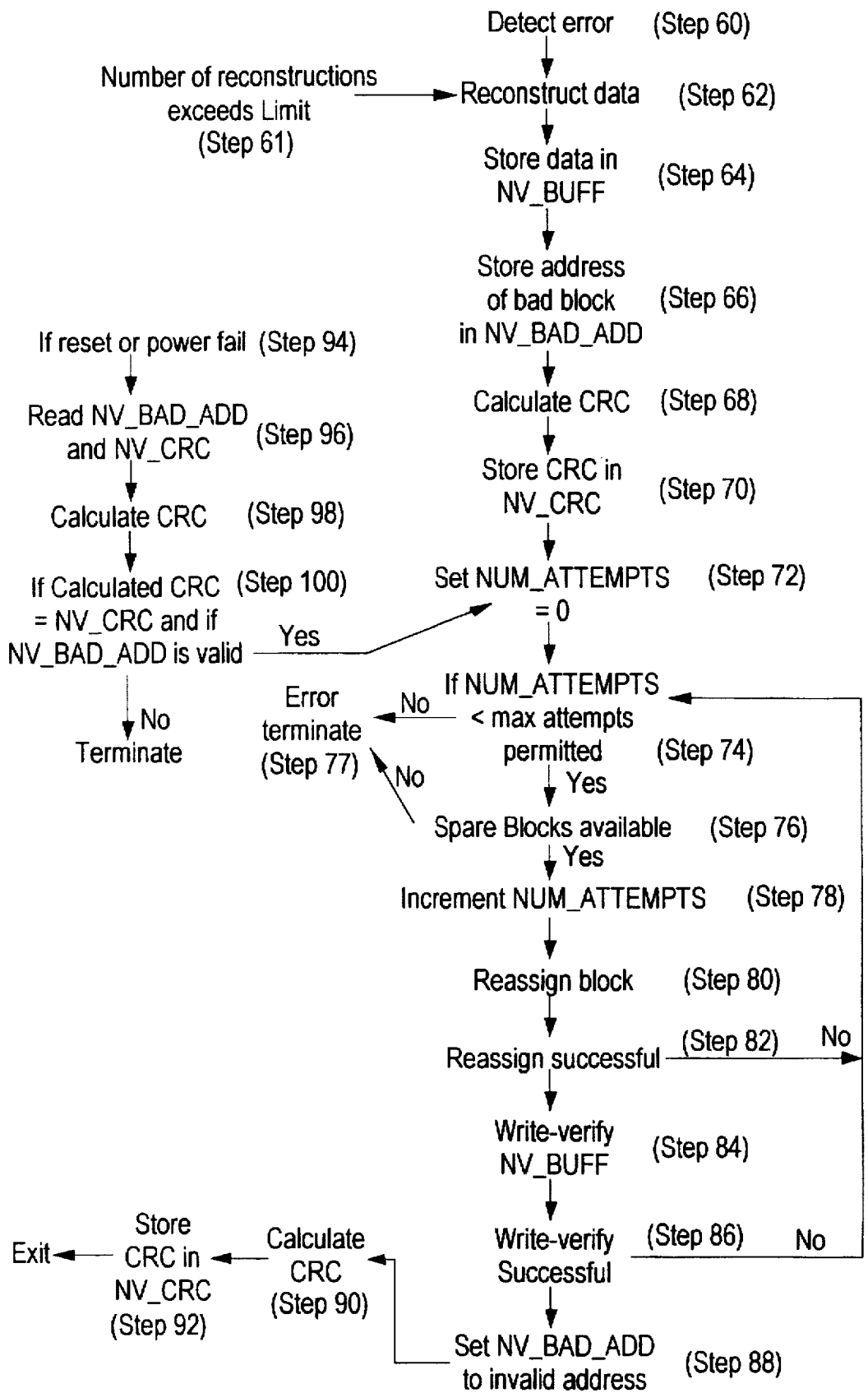
FIG. 3 depicts a flow chart of an embodiment of the method for reassigning data storage locations.

Referring also to FIG. 3, in one embodiment, when the disk controller 40 receives an error condition (Step 60) from the disk drive 48 that the data requested is unreadable, or if the disk controller 40 determines that the number of times the disk drive 48 has had to reconstruct the data exceeds a predetermined number of corrections allowed (Step 61), the disk controller 40 reconstructs the data that is unreadable (Step 62).

In the case in which the disk drive 48 can read the block and the number of times the disk drive 48 has had to reconstruct the data exceeds the permitted number of times, the disk controller 40 reconstructs the data by reading the data supplied by the disk drive 48 and then proceeds to reassign the data block. In the case in which the disk drive 48 is unable to read the data block, the method of data reconstruction is determined by the type of RAID system in which the invention is implemented. For example, the reconstruction of the data is accomplished in a mirrored system by reading a copy of the unreadable data from the corresponding mirrored disk, for example 50. In other RAID embodiments, the data is reconstructed using an error correcting code in conjunction with the readable data blocks on other disks in the RAID configuration, as is known in the art.

The reconstructed data is then written to a location, NV_BUFF (Step 64), in nonvolatile memory 52, such as a nonvolatile cache, located within the disk controller 40. Next the address of the unreadable block which is to be reassigned is written to a location, NV_BAD_ADD (Step 66), in nonvolatile memory 52. In one embodiment, a cyclic redundancy check (CRC) calculation is made on the data in NV_BUFF and NV_BAD_ADD (Step 68) and written to a location, NV_CRC (Step 70), also in nonvolatile memory 52. This is done to maintain a check on the integrity of the nonvolatile memory 52 in the event of a power failure or system reset.

A counter, NUM_ATTEMPTS, which counts the number of attempts the system has made to reassign the unreadable block, is initialized to 0 (Step 72) and the value in NUM_ATTEMPTS is checked to determine if it is less than a maximum number of attempts (Step 74). If the value in NUM_ATTEMPTS is greater than the maximum number of attempts permitted, the system reports the specific error (Step 77) and terminates the attempted block reassignment. The disk drive 48, 50 is not permitted to go through all the possible reassignment blocks before failing, because, while the reassignment is taking place, other I/O to the disk cannot be processed. Thus, if NUM_ATTEMPTS is greater than a maximum allowed value, the disk is assumed to be seriously compromised and would have to be replaced.

Otherwise, a determination is made whether there remain unassigned or spare blocks 18 to which data can be written (Step 76). If there are no unassigned blocks 18 to which the data can be written, the error is reported and the process terminated (Step 77). If there are spare blocks 18 available, the value in NUM_ATTEMPTS is incremented (Step 78). The disk is then instructed to reassign the address of the damaged block (Step 80) and a determination is made as to whether the reassignment is successful is made (Step 82). If the reassignment is unsuccessful, the system loops to determine if the value in NUM_ATTEMPTS is less than the maximum number of attempts permitted (Step 74). As long as NUM_ATTEMPTS is less than the maximum number of attempts permitted and there are spare blocks available for reassignment, the system will continue to change the address of the damaged block upon encountering a reassignment error.

If the reassignment is successful the disk is instructed to perform a WRITE-VERIFY (a write followed by an immediate read to determine if the correct data has been written and can be read) of the data in NV_BUFF to the reassigned location (Step 84). A determination is then made as to whether the WRITE-VERIFY was successful (Step 86) and if WRITE-VERIFY did not complete successfully, the system loops to determine if the value in NUM_ATTEMPTS is less than the maximum number of attempts permitted (Step 74). WRITE-VERIFY, for example, could fail if the first WRITE_VERIFY attempted to write to another unreadable block. If NUM_ATTEMPTS is less than the maximum number of attempts permitted, the system will continue attempting to reassign the address of the damaged block and attempting to write to the reassigned block as long as WRITE-VERIFY failures occur.

If the WRITE-VERIFY completes without error, the value in NV_BAD_ADD is set to a known nonvalid address, (Step 88), in one embodiment 0XFFFFFFFF, indicating that the reassignment of the block address and the writing of the reconstructed data to that address has been completed. A CRC calculation is again made of the data in NV_BAD_ADD and NV_BUFF (Step 90) and that value is stored in NV_CRC (Step 92). This CRC serves to verify that a nonvalid disk address is not present in NV_BAD_ADD. The reassignment of the unreadable block and the writing of the reconstructed data to the reassigned block is therefore completed.

Upon a system reset (or power failure) (Step 94) the address in NV_BAD_ADD is read and the value in NV_CRC is read (Step 96). A CRC calculation is performed on NV_BAD_ADD and NV_BUFF (Step 98). If NV_BAD_ADD is a valid address and if the value in NV_CRC equals the value of the CRC calculation just performed (Step 100), then a block reassignment was in progress when the power failure occurred (or the system was reset) and another block reassignment and writing is attempted (Step 72). If the CRC values are not equal, then it is possible that the nonvolatile memory 52 has been affected by the reset or the power failure.

Thus in the present embodiment, NV_BAD_ADD acts as a flag to indicate whether a block reassignment was in progress at the power failure or system reset. If NV_BAD_ADD contains a valid disk address, a block reassignment was in progress and should be reattempted if possible. If NV_BAD_ADD contains an nonvalid address no block assignment was in progress when the system reset or power failure occurred. If the NUM_ATTEMPTS is too large or the nonvolatile memory appears to show an error (for example, if the CRC calculated is not equal to the value in NV_CRC), the read request is still satisfied by the reconstructed data and from that point, the other read requests for that data would have to reconstruct the data again.

It should be noted that although in the embodiment just discussed the disk controller 40 reassigns a block if the disk drive 48 has had to reconstruct the block more than a predetermined number of times, a block reassignment could be attempted the first time the block has experienced an error.

Having shown the preferred embodiment, those skilled in the art will recognize that variations are possible and the invention should be viewed as limited solely by the scope and spirit of the appended claims.

What is claimed is:

1. A system for reassigning a data storage location containing corrupted data to a new data storage location containing reconstructed previously corrupted data, said system comprising:

at least one persistent medium storage device having a plurality of data storage locations; and a persistent medium storage device controller having a nonvolatile memory, said persistent medium storage device controller in electrical communication with said at least one persistent medium storage device, said persistent medium storage device controller being operative to detect corrupted data on said at least one persistent medium storage device, to reconstruct said corrupted data, to write said reconstructed data to a location in said nonvolatile memory, and to set an indicator flag in a location in said nonvolatile memory indicating that said corrupted data has been reconstructed and said reconstructed data is being written to a reassigned location on said at least one persistent medium storage device, said persistent medium storage device controller being operative to assign a new storage location on said at least one persistent medium storage device for said reconstructed data and to write said reconstructed data to said new storage location, said persistent medium storage device controller being operative to determine whether said reconstructed data has been correctly written to said new storage location, and to reset said indicator flag in said nonvolatile memory if said reconstructed data has been correctly written to said new storage location.

2. The system of claim 1 wherein said at least one persistent medium storage device is a magnetic disk device.

3. The system of claim 1 wherein said at least one persistent medium storage device is one of a mirrored pair of disks.

4. The system of claim 3 wherein said persistent medium storage device controller reconstructs corrupted data on said one of said mirrored pair of disks by copying data corresponding to said corrupted data from the other of said mirrored pair of disks.

5. The system of claim 1 wherein said indicator flag is set by writing the address of said corrupted data to a predetermined location in said nonvolatile memory.

6. The system of claim 5 wherein said indicator flag is reset by writing a nonvalid address to said predetermined location in said nonvolatile memory.

7. A system according to claim 1, wherein said persistent medium storage device controller is operative upon a system reset or power failure to determine whether said indicator flag in said nonvolatile memory is set, and if said indicator flag in said nonvolatile memory is set, then to repeat the operations of assigning said new storage location, writing said reconstructed data to said new storage location, determining whether said reconstructed data has been correctly written to said new storage location, and resetting said indicator flag if said reconstructed data has been correctly written.

8. A method for reassigning a data storage location containing corrupted data to a new data storage location containing reconstructed previously corrupted data in a system including at least one persistent medium storage device in electrical communication with a persistent medium storage device controller having a nonvolatile memory, said method comprising the steps of:

detecting corrupted data on said at least one persistent medium storage device;

reconstructing said corrupted data;

writing said reconstructed data to a location in said nonvolatile memory;

setting an indicator flag in said nonvolatile memory indicating that said corrupted data has been reconstructed and said reconstructed data is being written to a reassigned location on said at least one persistent medium storage device;

assigning a new storage location on said at least one persistent medium storage device for said reconstructed data;

writing said reconstructed data to said new storage location;

determining whether said reconstructed data has been correctly written to said new storage location; and resetting said indicator flag in said nonvolatile memory if said reconstructed data has been correctly written to said new storage location.

9. The method of claim 8 wherein said at least one persistent medium storage device comprises one of a mirrored pair of disks and wherein said step of reconstructing said corrupted data comprises copying data corresponding to said corrupted data from the other of said mirrored pair of disks.

10. The method of claim 8 wherein said at least one persistent medium storage device comprises one of a plurality of RAID persistent medium storage devices, and wherein said step of reconstructing said corrupted data comprises using an error correcting block from one of said plurality of RAID persistent medium storage devices in conjunction with respective data blocks from others of said plurality of RAID persistent medium storage devices, said respective data blocks being used to generate an error correcting code in said error correcting block.

11. The method of claim 8 wherein said step of setting an indicator flag in said nonvolatile memory indicating that said corrupted data has been reconstructed and said reconstructed data is being written to a reassigned location on said at least one persistent medium storage device comprises writing the address of said corrupted data to a predetermined location in said nonvolatile memory.

12. The method of claim 11 wherein said step of resetting said indicator flag in said nonvolatile memory if said reconstructed data has been correctly written to said new storage location comprises writing a nonvalid address to said predetermined location in said nonvolatile memory.

13. A method according to claim 8, further comprising the steps of:

upon a system reset or power failure, determining whether said indicator flag in said nonvolatile memory is set; and if said indicator flag in said nonvolatile memory is set, then repeating the steps of assigning a new storage location, writing said reconstructed data to said new storage location, determining whether said reconstructed data has been correctly written to said new storage location, and resetting said indicator flag if said reconstructed data has been correctly written.

14. A system for reassigning a data storage location containing corrupted data to a new data storage location containing reconstructed previously corrupted data, said system comprising:

at least one persistent medium storage device having a plurality of data storage locations; and a persistent medium storage device controller having a nonvolatile memory, said persistent medium storage device controller in electrical communication with said at least one persistent medium storage device, said persistent medium storage device controller being operative to detect corrupted data on said at least one persistent medium storage device, to reconstruct said corrupted data into reconstructed data, to write said reconstructed data to a temporary storage location in said nonvolatile memory, and to set an indicator in said nonvolatile memory after said reconstructed data has been written to said temporary storage location in said nonvolatile memory, said persistent medium storage device controller being operative to assign a new storage location on said at least one persistent medium storage device for said reconstructed data and to transfer said reconstructed data from said temporary storage location to said new storage location, said persistent medium storage device controller being operative to determine whether said reconstructed data has been correctly transferred to said new storage location, and to reset said indicator in said nonvolatile memory if said reconstructed data has been correctly transferred to said new storage location.

15. The system of claim 14 wherein said indicator is set by writing the address of said corrupted data on said at least one persistent medium storage device to a predetermined location in said nonvolatile memory.

16. The system of claim 15 wherein said indicator is reset by writing a nonvalid address to said predetermined location in said nonvolatile memory.

17. A system according to claim 14, wherein said persistent medium storage device controller is operative upon a system reset or power failure to determine whether said indicator in said nonvolatile memory is set, and if said indicator in said nonvolatile memory is set, then to repeat the operations of assigning said new storage location, transferring said reconstructed data from said temporary storage to said new storage location, determining whether said reconstructed data has been correctly transferred to said new storage location, and resetting said indicator if said reconstructed data has been correctly transferred.

18. A method for reassigning a data storage location containing corrupted data to a new data storage location containing reconstructed previously corrupted data in a system including at least one persistent medium storage device in electrical communication with a persistent medium storage device controller having a nonvolatile memory, said method comprising the steps of:

detecting corrupted data on said at least one persistent medium storage device;

reconstructing said corrupted data into reconstructed data;

writing said reconstructed data to a temporary storage location in said nonvolatile memory;

setting an indicator in said nonvolatile memory after said reconstructed data has been written to said temporary storage location in said nonvolatile memory;

assigning a new storage location on said at least one persistent medium storage device for said reconstructed data;

transferring said reconstructed data from said temporary storage location to said new storage location;

determining whether said reconstructed data has been correctly transferred to said new storage location; and resetting said indicator in said nonvolatile memory if said reconstructed data has been correctly transferred to said new storage location.

19. The method of claim 18 wherein said step of setting an indicator in said nonvolatile memory comprises writing the address of said corrupted data on said at least one persistent medium storage device to a predetermined location in said nonvolatile memory.

20. The method of claim 19 wherein said step of resetting said indicator in said nonvolatile memory after said reconstructed data has been transferred to said new storage location comprises writing a nonvalid address to said predetermined location in said nonvolatile memory.

21. A method according to claim 18, further comprising the steps of:

upon a system reset or power failure, determining whether said indicator in said nonvolatile memory is set; and if said indicator said nonvolatile memory is set, then repeating the steps of assigning a new storage location, transferring said reconstructed data from said temporary storage location to said new storage location, determining whether said reconstructed data has been correctly transferred to said new storage location, and resetting said indicator if said reconstructed data has been correctly transferred.

\* \* \* \* \*